(12) United States Patent
Bogdanov et al.

(10) Patent No.: US 7,758,748 B2
(45) Date of Patent: Jul. 20, 2010

(54) SURFACE SKIMMER WITH FLOTATION SUPPORT

(76) Inventors: Leon Bogdanov, 538 E Long Lake Rd., Troy, MI (US) 48085; Shirley Hanna, 538 E Long Lake Rd., Troy, MI (US) 48085

( * ) Notice: Subject to any disclaimer, the term of this patent is extended or adjusted under 35 U.S.C. 154(b) by 0 days.

(21) Appl. No.: 12/229,837

(22) Filed: Aug. 27, 2008

(65) Prior Publication Data

US 2009/0057214 A1 Mar. 5, 2009

Related U.S. Application Data

(60) Provisional application No. 60/966,287, filed on Aug. 27, 2007.

(51) Int. Cl.
*E04H 4/16* (2006.01)
(52) U.S. Cl. .............. 210/167.1; 210/242.1; 210/470; 4/496
(58) Field of Classification Search .............. 210/167.1, 210/242.1, 470, 471; 4/490, 496
See application file for complete search history.

(56) References Cited

U.S. PATENT DOCUMENTS

| 4,176,419 | A | * | 12/1979 | MacDonald | 15/1.7 |
| 4,822,487 | A | * | 4/1989 | Soich | 210/238 |
| 5,043,060 | A | * | 8/1991 | Brennan | 210/122 |
| 5,350,508 | A | * | 9/1994 | Van der Watt | 210/167.2 |
| 5,385,666 | A | * | 1/1995 | Perlsweig | 210/238 |
| 5,422,001 | A | * | 6/1995 | Yagoda et al. | 210/238 |
| 5,705,058 | A | * | 1/1998 | Fischer | 210/237 |
| 6,358,410 | B1 | * | 3/2002 | Lambert | 210/238 |
| 6,383,374 | B1 | * | 5/2002 | Splendorio | 210/238 |
| 2004/0108259 | A1 | * | 6/2004 | Giannantonio | 210/169 |

* cited by examiner

*Primary Examiner*—Fred Prince
(74) *Attorney, Agent, or Firm*—Gifford, Krass, Sprinkle, Anderson & Citkowski, P.C.

(57) ABSTRACT

A handheld surface skimmer with flotation support to lighten the load on the operator. Other improvements include a hinge or swivel for ease of positioning the skimmer, and optional brushes to allow cleaning the sides of a swimming pool. If desired, a drawstring may be added to raise the skimmer's screen element for movement around the pool and for stowage.

5 Claims, 6 Drawing Sheets

Fig. 3A TOP VIEW
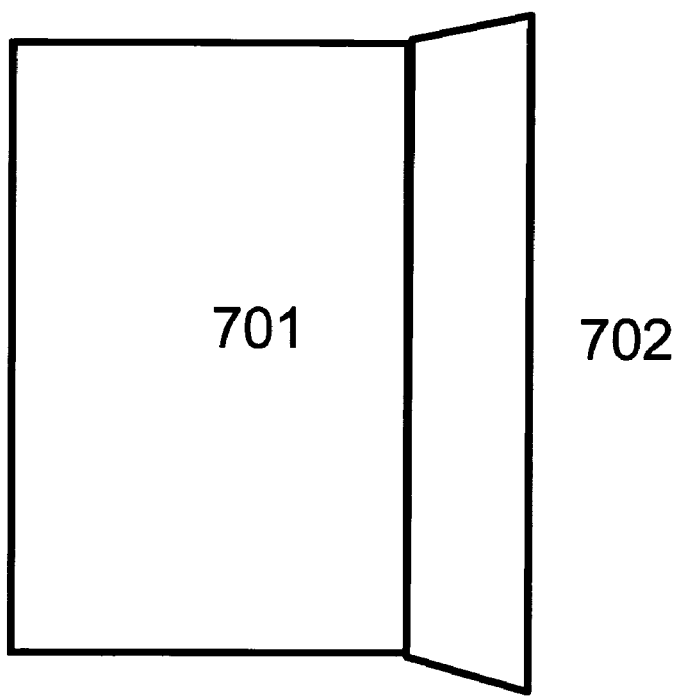
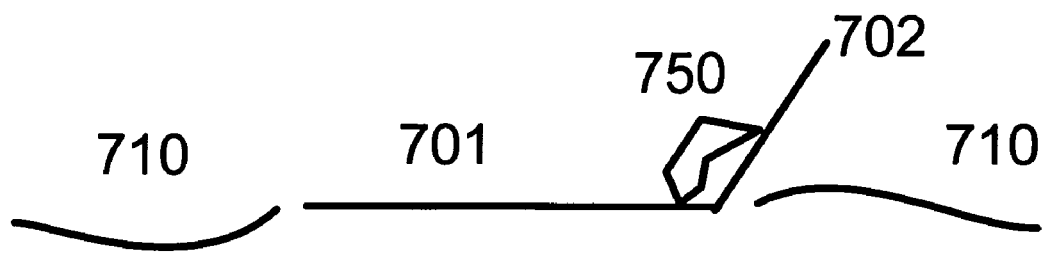
Fig. 3B SIDE VIEW

SURFACE SKIMMER WITH FLOTATION SUPPORT

PRIORITY

This application claims the benefit of the filing date of U.S. Provisional Patent Application No. 60/966,287 filed Aug. 27, 2007 entitled "Liquid Surface Skimmer with Flotation Support" under 35 USC sections 119 and 120, and said Provisional Patent Application is incorporated herein by reference.

BACKGROUND

This invention relates to methods and apparatus for cleaning the surface of a pool of liquid.

There has been a long-felt but unsolved need to clean a pool effectively without undue effort from or physical strain on cleanup personnel. The conventional pool skimmer, composed of simply a handle with a screen, is tiring to hold over the surface of a pool and requires continual exertion to continuously lift to maintain the proper skimming level, resulting in strain on the operator.

SUMMARY

Objects and Advantages: To reduce strain and facilitate speedy and effective cleanup of a pool of liquid through adding one or more flotation, hinge, or swivel elements to the basic skimmer. Refinements to the preferred embodiment include structure to expedite cleaning of the sides of the pool, and a secondary way to raise the strainer element.

BRIEF DESCRIPTION OF THE DRAWINGS

FIGS. 3A and 3B illustrate an improvement to the invention, featuring an angled straining surface that traps debris as the skimmer is pushed through the liquid, here shown as being pushed from right to left.

DETAILED DESCRIPTION OF THE INVENTION

Figure 1:
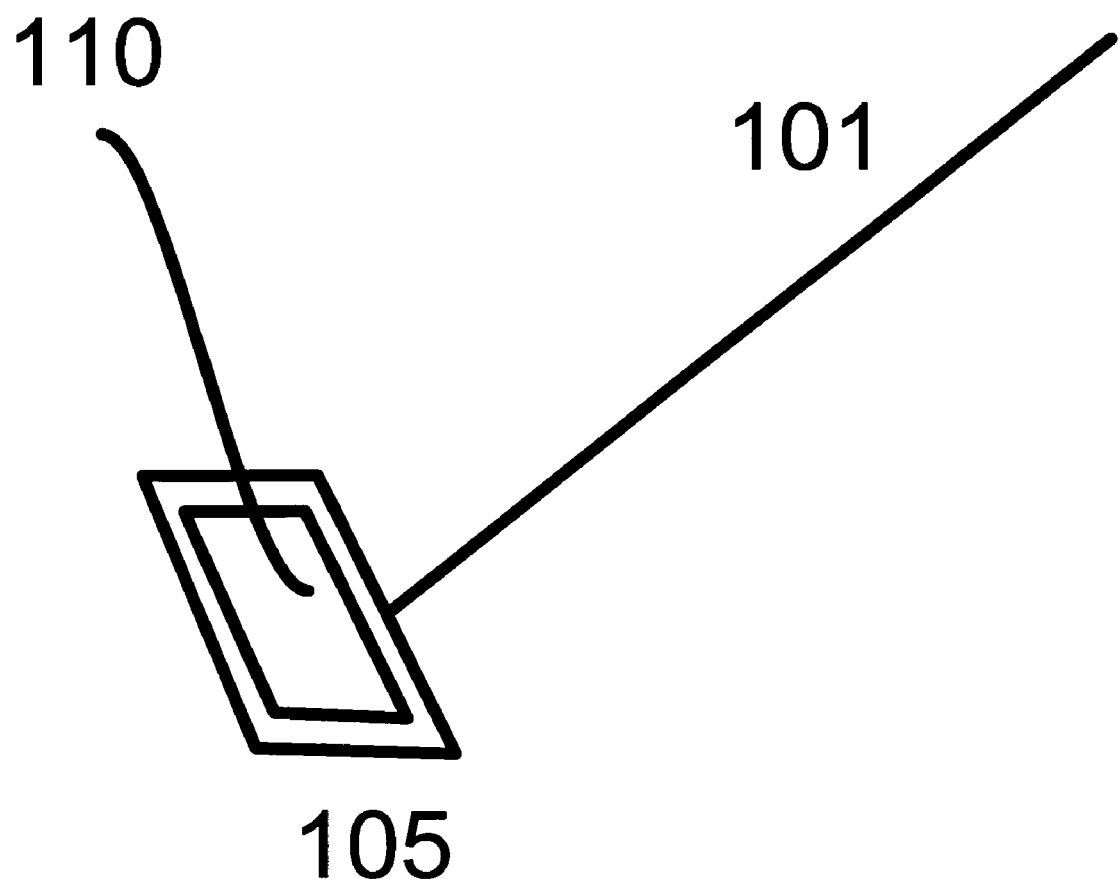
FIG. 1 illustrates a prior art pool skimmer, comprising a screen frame, screen, and handle.

In order to explain the construction and merits of the invention, the prior art baseline is explained first. In FIG. 1 (prior art), a handle (101) is connected to a frame (105), which in turn supports a screen or strainer element (110). In order to avoid duplicate use of various terms, it is understood the words screen or strainer in this discussion will imply a netting, crosshatched wires, or other configuration of materials that prevents solid objects from passing through while allowing liquid to freely pass.

Figure 2:
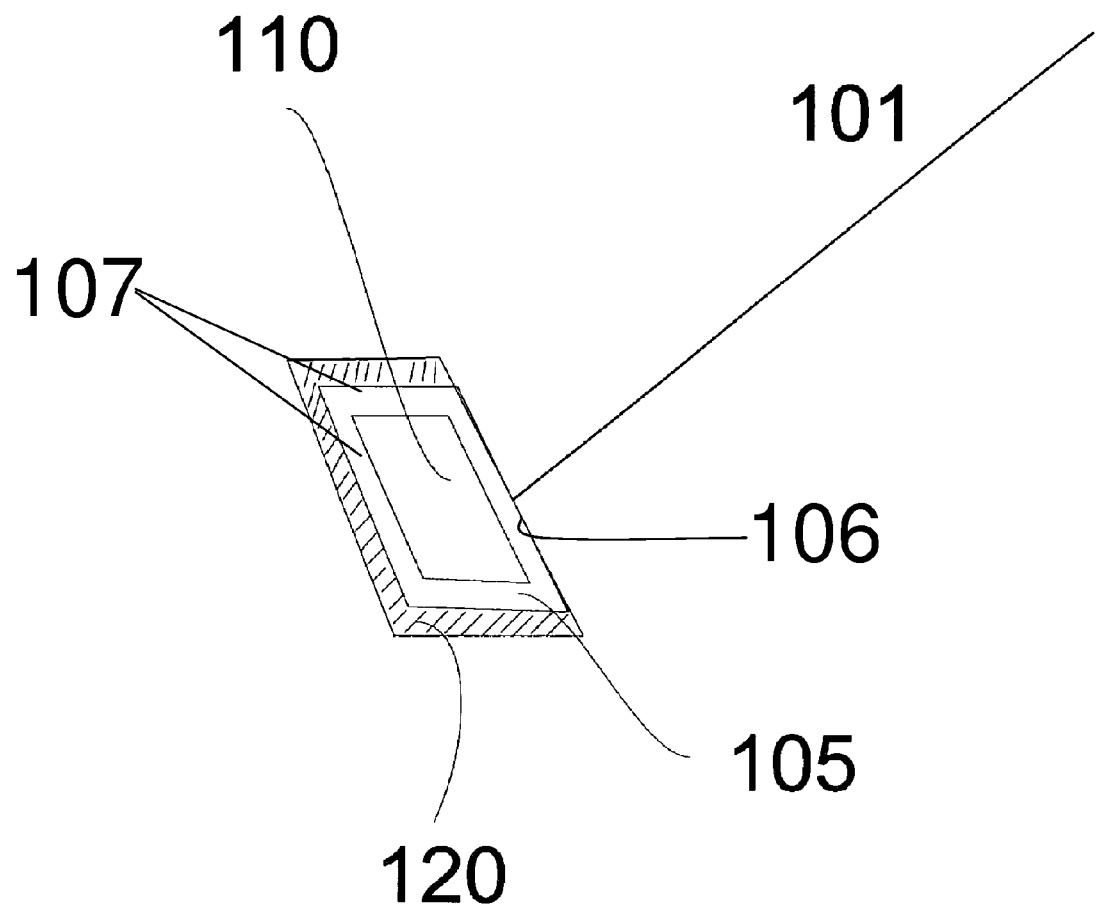
FIG. 2 illustrates a first preferred embodiment of the invention where the frame and screen have flotation support, along with a handle.

One of the present inventive improvements is shown in FIG. 2. Here, a handle 101 is connected to a frame 105, which in turn supports a screen or strainer element 110 on the frames' interior, as with the prior art. One improvement is the attachment of a flotation device 120 on the exterior of the frame 105. The frame has a leading edge portion 106 and a trailing edge portion 107. The flotation material does not have to be present at all exterior points of the frame, but may be positioned on arbitrary subsections of the frame for ease of manufacture or maintenance.

A further improvement, shown in FIG. 3, is to configure the strainer element to block debris from returning back to the body of liquid. This is performed with a bend in the strainer material as shown in FIG. 3A, creating a division between strainer surface planar portion 701 parallel to the liquid, and strainer surface turned up portion 702 tilted up from the liquid.

FIG. 3B shows the strainer material bend as it would be used while skimming. Thus the back portion 702 creates a restraining wall to prevent debris 750 from returning to the body of the liquid 710, while allowing the liquid to pass through.

Figure 4:
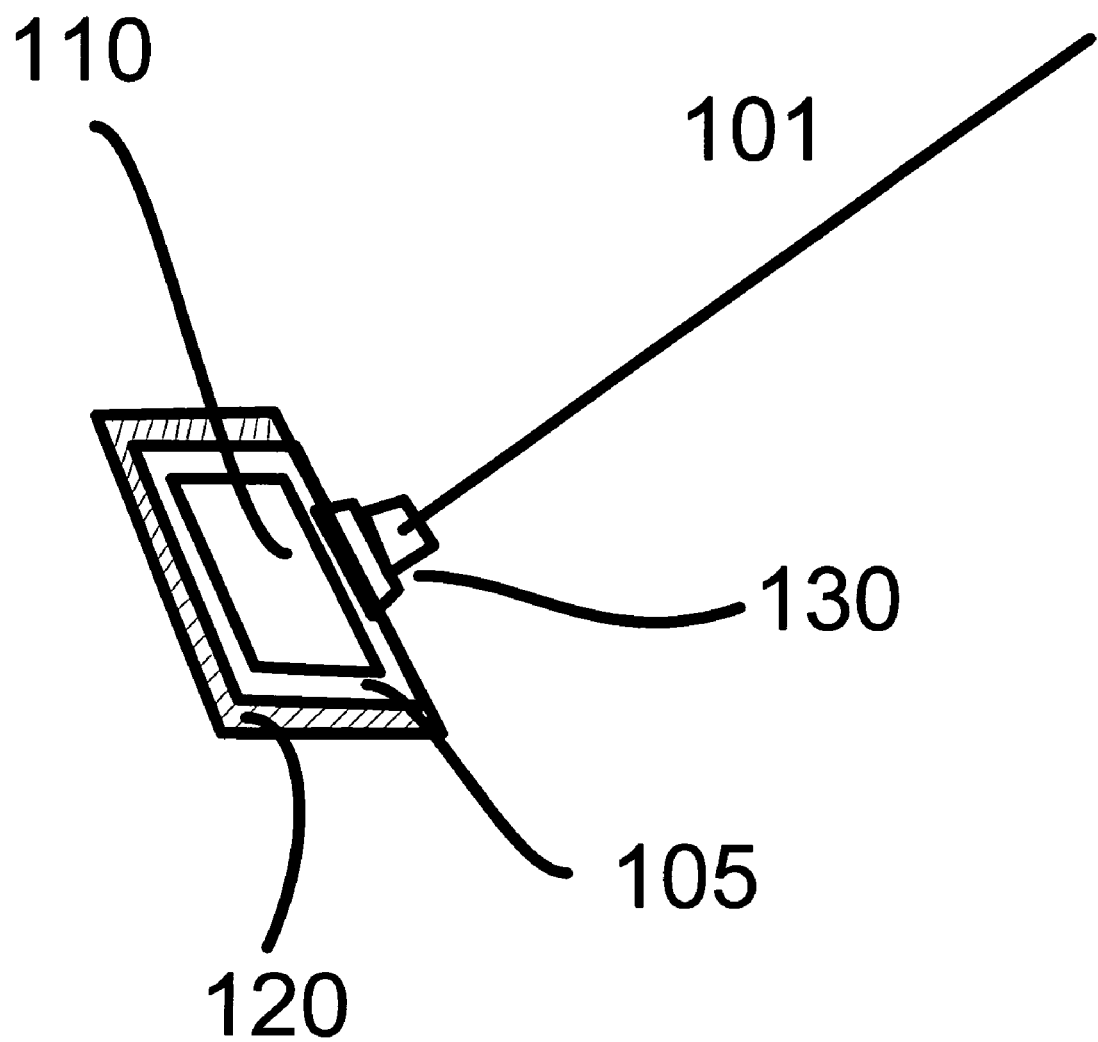
FIG. 4 illustrates a second preferred embodiment with a hinge element, allowing motion of the handle relative to the other elements.

In another embodiment of the invention, as shown in FIG. 4, a hinge (130) may connect the handle (101) to the frame (105), allowing continuous angle adjustment between the handle and filter. The hinge may be of the rod and bearing type whereby the rod element rotates within one or more bearing elements, or comprised of a flexible material that allows angular movement.

Figure 5:
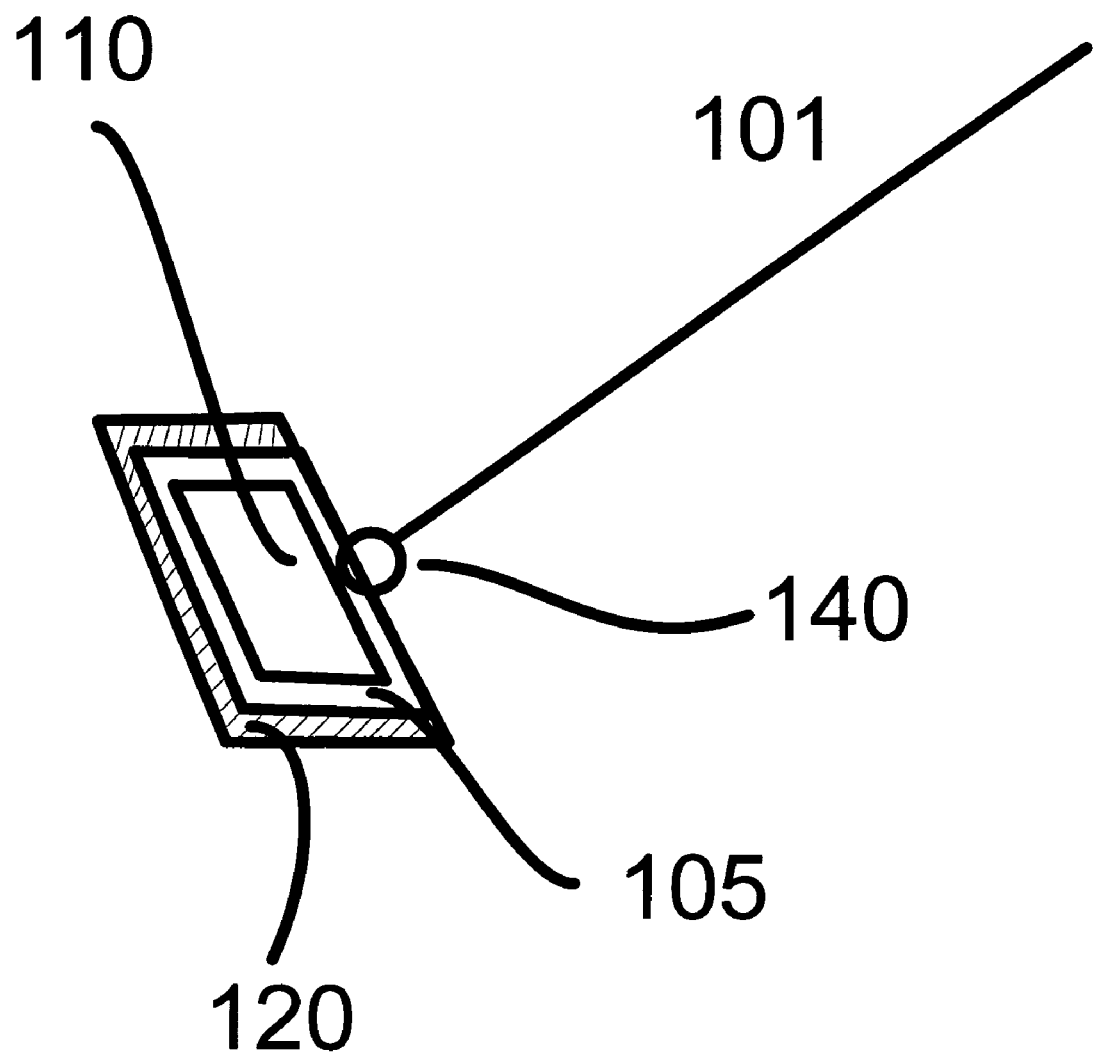
FIG. 5 illustrates an alternative embodiment with a swivel element allowing relative motion of the handle along a different axis compared to the hinge in FIG. 4.

In yet another embodiment of the invention, shown in FIG. 5, a swivel (140) may allow the handle to rotate about its axis while in use, thus providing the operator with additional range of motion. The swivel may be either of the cylindrical rod and bearing type, allowing one axis of motion, or of a cylindrical ball within a cylindrical bearing, allowing two axes of motion.

Figure 6:
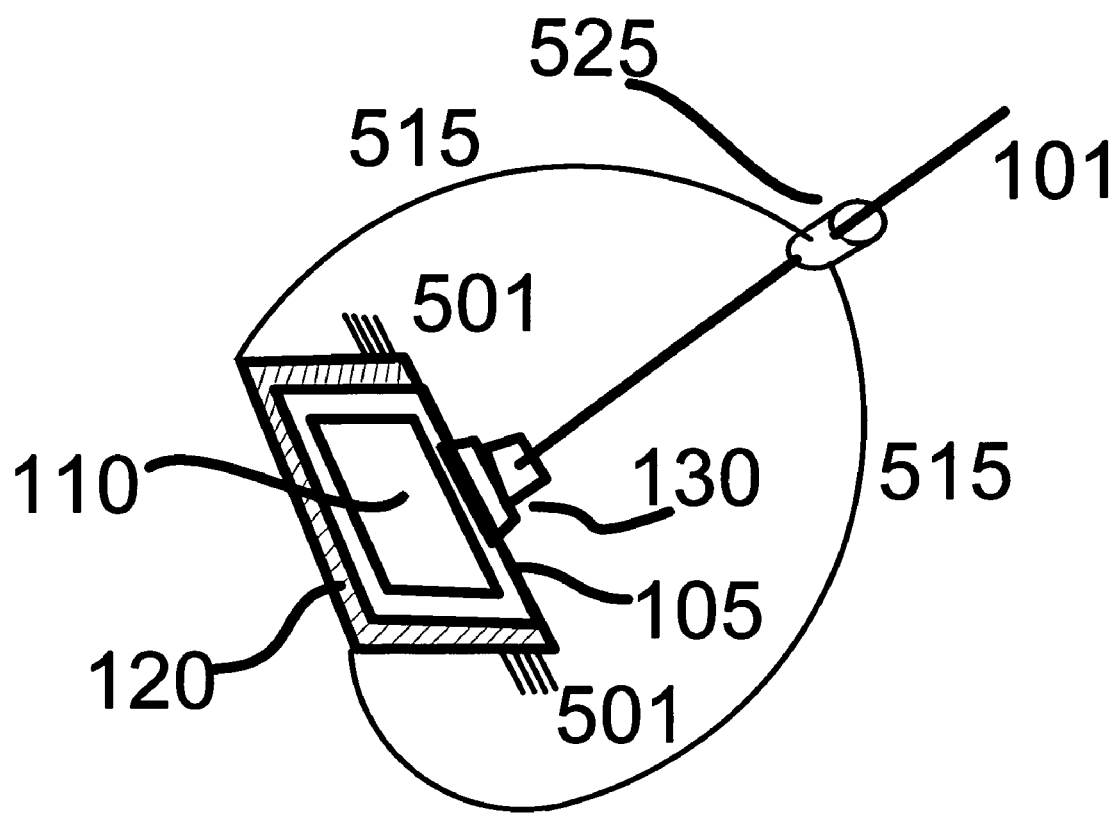
FIG. 6 illustrates yet another alternative embodiment including a brush element and a drawstring element.

In still another embodiment of the invention, shown in FIG. 6, brush elements (501) are shown to either side of the frame (105), which may be directly rubbed against the surface of the pool for a second type cleaning action. A drawstring element (515) is available to pull on one side of the screen frame (105) opposite the hinge, so that the frame may be moved upwards toward the handle, both for use in skimming and also for storage. If needed for heavier duty uses, a chain or rope may be substituted for the drawstring.

Finally, a slider element (525) conveniently follows the axis of the handle both to keep the drawstring in place and to provide a convenient control point for the operator.

Whereas several preferred embodiments to the invention have been illustrated and described in detail, it will be apparent that various changes may be made in the disclosed embodiments without departing from the scope or spirit of the invention. While it is understood that the initial intention of this invention is to reduce the effort of pool cleaning, a similar configuration of materials may have uses in areas such as metal refining and toxic spill cleanup.

We claim:

1. A skimmer apparatus for a liquid surface comprising a strainer frame having a leading edge portion;
   a trailing edge portion mounted to the strainer frame;
   a strainer element having a generally planar portion extending from the leading edge of the strainer frame generally parallel to the liquid surface;
   a flotation element mounted to the trailing edge portion of the strainer from whereby the planar portion is supported parallel to the liquid; and
   a handle mounted to the leading edge of the strainer frame by a hinge.

2. The apparatus of claim 1 including a swivel element between said handle and said strainer frame.

3. The apparatus of claim 1 including brush elements along said strainer frame, whereby the sides of a pool may be cleaned.

4. The apparatus of claim 1 including one or more drawstrings attached at one end to a slider element along said handle, and also to said strainer frame.

5. The apparatus of claim 1 wherein the strainer element has a turned up portion which is angled upwardly from the planar portion to gather debris.

* * * * *